United States Patent
Park et al.

(10) Patent No.: US 10,961,389 B2
(45) Date of Patent: Mar. 30, 2021

(54) BIODEGRADABLE POLYMER RESIN COMPOSITION AND MOLDED ARTICLE THEREOF

(71) Applicant: LOTTE CHEMICAL CORPORATION, Seoul (KR)

(72) Inventors: Ji Hae Park, Daejeon (KR); Kwang Hyun Paek, Daejeon (KR); Yong Taek Hwang, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 89 days.

(21) Appl. No.: 16/337,891

(22) PCT Filed: Sep. 29, 2017

(86) PCT No.: PCT/KR2017/010911
§ 371 (c)(1),
(2) Date: Mar. 28, 2019

(87) PCT Pub. No.: WO2018/062928
PCT Pub. Date: Apr. 5, 2018

(65) Prior Publication Data
US 2019/0233640 A1    Aug. 1, 2019

(30) Foreign Application Priority Data
Sep. 29, 2016    (KR) .................. 10-2016-0125880

(51) Int. Cl.
| | | |
|---|---|---|
| C08L 69/00 | (2006.01) | |
| C08L 67/00 | (2006.01) | |
| C08G 64/02 | (2006.01) | |
| C08G 64/18 | (2006.01) | |
| C08L 67/04 | (2006.01) | |

(52) U.S. Cl.
CPC .......... *C08L 69/005* (2013.01); *C08G 64/02* (2013.01); *C08G 64/18* (2013.01); *C08L 67/00* (2013.01); *C08L 67/04* (2013.01); *C08L 69/00* (2013.01); *C08L 2201/06* (2013.01); *C08L 2205/03* (2013.01)

(58) Field of Classification Search
CPC .................................................. C08L 69/005
See application file for complete search history.

(56) References Cited

U.S. PATENT DOCUMENTS

| | | |
|---|---|---|
| 5,827,905 A | 10/1998 | Grigat et al. |
| 5,880,224 A | 3/1999 | Miura et al. |
| 5,883,199 A | 3/1999 | McCarthy et al. |
| 2010/0160559 A1* | 6/2010 | Lee ............... C08L 51/003 525/67 |
| 2014/0200326 A1 | 7/2014 | Yamauchi et al. |

FOREIGN PATENT DOCUMENTS

| | | |
|---|---|---|
| EP | 0823449 A2 | 2/1998 |
| JP | H09-137046 A | 5/1997 |
| JP | H10-45884 A | 2/1998 |
| JP | 2003-082140 A | 3/2003 |
| JP | 2004-0359730 A | 12/2004 |
| JP | 2009-543909 A | 12/2009 |
| JP | 2013-224398 A | 10/2013 |
| JP | 2016-533428 A | 10/2016 |
| KR | 10-2005-0056021 A | 6/2005 |
| KR | 10-0642289 B1 | 11/2006 |
| KR | 10-2012-0081232 A | 7/2012 |
| KR | 10-1326916 B1 | 11/2013 |
| KR | 10-1396110 B1 | 5/2014 |
| KR | 10-2014-0075468 A | 6/2014 |
| KR | 10-2016-0055564 A | 5/2016 |

OTHER PUBLICATIONS

International Search Report and Written Opinion of the International Searching Authority, corresponding to PCT/KR2017/010911, dated Jan. 18, 2018, 11 pages.

Extended European Search Report from corresponding European Application No. 17856814.3, Extended European Search Report dated Jan. 31, 2020 and dated Feb. 7, 2020 (5 pgs.).

\* cited by examiner

*Primary Examiner* — Wenwen Cai
(74) *Attorney, Agent, or Firm* — Lewis Roca Rothgerber Christie LLP

(57) ABSTRACT

The prevent invention relates to a biodegradable polymer resin composition which can realize excellent mechanical properties together with biodegradability and has improved molding processability, and a molded article thereof. The biodegradable polymer resin composition may include a polycarbonate-polyester copolymer including a branched repeating unit containing a mediating functional group including a central element and five to ten alkylene or heteroalkylene functional groups bonded to the mediating functional group, an aliphatic polycarbonate repeating unit having a chain structure, and an aromatic polyester repeating unit, and a biodegradable polyester resin having a melt index (measured at 190° C., 2.16 kg) of 3 g/10 min to 20 g/10 min.

17 Claims, No Drawings

BIODEGRADABLE POLYMER RESIN COMPOSITION AND MOLDED ARTICLE THEREOF

CROSS-REFERENCE TO RELATED APPLICATIONS

This application is a National Phase Patent Application and claims priority to and the benefit of International Application Number PCT/KR2017/010911, filed on Sep. 29, 2017, which claims priority to and the benefit of Korean Patent Application Number 10-2016-0125880, filed Sep. 29, 2016, the entire contents of all of which are incorporated herein by reference.

TECHNICAL FIELD

The present invention relates to a biodegradable polymer resin composition and a molded article thereof. More specifically, the prevent invention relates to a biodegradable polymer resin composition which can realize excellent mechanical properties together with biodegradability and has improved molding processability, and a molded article thereof.

BACKGROUND ART

Aliphatic polycarbonate resins are applied in a wide range of fields such as films known as biodegradable resins, garbage bags, sheets, food containers, automobile interior materials, and the like. Generally, the carbonate functional group contained in the aliphatic polycarbonate resin has biodegradability, but when actually decomposed by microorganisms in nature or decomposed by itself, its decomposition rate is considerably slow and it takes a lot of time for biodegradation. In addition, when an aromatic monomer is added in order to secure structural stability of the aliphatic polycarbonate resin and to increase the molecular weight, the aliphatic polycarbonate resin has a limitation in that the biodegradation rate becomes lower.

On the other hand, in the case of an aliphatic polyester resin, it is widely used due to excellent biodegradability and excellent processability, but due to its fast biodegradability, it is limited in that the lifetime is shortened when applied to the product. In addition, the aliphatic polycarbonate resin and the aliphatic polyester resin themselves have insufficient mechanical properties, and thus there are limits in their application as a product.

Therefore, studies have been made on a biodegradable copolymer resin having an appropriate level of biodegradation rate, high molecular weight, excellent processability, and improved heat resistance by incorporating a carbonate group and an ester group into the polymer chain.

However, due to exposure to atmospheric moisture or heating during the manufacturing process of pellets, which are raw materials for plastic products, or during the manufacturing process of the products, there is a problem that a hydrolysis reaction proceeds in the resin, so that not only are the initial physical properties of the molded article deteriorated or eliminated, but also an unstable biodegradation rate of the product is brought about.

In addition, the crystallization rate is slow due to the combination of multiple components in the polymer crystal structure. Consequently, there are problems that the inner surfaces of the films stick to each other when forming a blown film, and the films are not smoothly unwound from a roll during secondary processing.

In view of the above, there is a need to develop a biodegradable resin composition which can be used for manufacturing various molded articles such as packaging films having excellent mechanical properties and moldability together with biodegradability.

DETAILED DESCRIPTION OF THE INVENTION

Technical Problem

It is an object of the present invention to provide a biodegradable polymer resin composition which can realize excellent mechanical properties together with biodegradability and has improved molding processability.

It is another object of the present invention to provide a molded article using the above-mentioned biodegradable polymer resin composition.

Technical Solution

The present invention provides a biodegradable polymer resin composition including: a polycarbonate-polyester copolymer including a branched repeating unit containing a mediating functional group including a central element and five to ten alkylene or heteroalkylene functional groups bonded to the mediating functional group, an aliphatic polycarbonate repeating unit having a chain structure, and an aromatic polyester repeating unit; and a biodegradable polyester resin having a melt index (measured at 190° C., 2.16 kg) of 3 g/10 min to 20 g/10 min.

The present invention also provides a molded article using the above-mentioned biodegradable polymer resin composition.

Hereinafter, a biodegradable polymer resin composition and a molded article thereof according to specific embodiments of the present invention will be described in more detail.

According to one embodiment of the present invention, a biodegradable polymer resin composition is provided, including: a polycarbonate-polyester copolymer including a branched repeating unit containing a mediating functional group including a central element and five to ten alkylene or heteroalkylene functional groups bonded to the mediating functional group, an aliphatic polycarbonate repeating unit having a chain structure, and an aromatic polyester repeating unit; and a biodegradable polyester resin having a melt index (measured at 190° C., 2.16 kg) of 3 g/10 min to 20 g/10 min.

The present inventors found through experiments that when the above-mentioned specific biodegradable polymer resin composition is used, biodegradability and mechanical properties are improved by using a polycarbonate-polyester copolymer containing a branched repeating unit capable of enhancing mechanical properties through formation of an internal crosslinking structure while having biodegradability, and simultaneously, the molding processability of a film or the like can be improved by compounding a specific biodegradable polyester resin, thereby completing the present invention.

Specifically, the biodegradable polymer resin composition of one embodiment of the invention may include a polycarbonate-polyester copolymer including an aliphatic polycarbonate repeating unit having a chain structure, an aromatic polyester repeating unit, and a branched repeating unit containing a mediating functional group including a central element and five to ten, or six to eight, alkylene or heteroalkylene functional groups bonded to the mediating functional group. Examples of the copolymerization type of the copolymer are not particularly limited, but for example, it may be random copolymerization or block copolymerization.

In particular, the polycarbonate-polyester copolymer may include a branched repeating unit containing a mediating functional group including a central element and five to ten alkylene or heteroalkylene functional groups bonded to the mediating functional group.

The mediating functional group means a functional group capable of mediating the binding of the above-mentioned five to ten alkylene or heteroalkylene functional groups, and the mediating functional group may mean one or more central elements selected from the group consisting of carbon, nitrogen, phosphorus, sulfur, oxygen, and silicon, or an atomic group containing the same.

The above-mentioned five to ten alkylene or heteroalkylene functional groups may form a bond via the central element or the atomic group including the central element. More specifically, five to ten alkylene or heteroalkylene functional groups may be simultaneously bonded to one mediating functional group containing the central element.

As described above, as the branched repeating unit contained in the polycarbonate-polyester copolymer contains five to ten alkylene or heteroalkylene functional groups as a crosslinking functional group, the surface area capable of reacting with one or more types of repeating units, polymers, or compounds in the polycarbonate-polyester copolymer is increased, and thus a crosslinking structure can be formed more easily. Consequently, not only can the mechanical properties of the polycarbonate-polyester copolymer be improved, but also the molding processability can be increased as the molecular weight distribution becomes wider.

Further, in the branched repeating unit, one terminal of the alkylene or heteroalkylene functional group can be bonded to a mediating functional group including the central element, and the other terminal of the alkylene or heteroalkylene functional group may act as a point of reaction with one or more types of repeating units, polymers, or compounds contained in the copolymer.

The central element contained in the branched repeating unit may include one or more selected from the group consisting of carbon, nitrogen, phosphorus, sulfur, oxygen, and silicon. The alkylene group is a bivalent functional group derived from alkane, and may be, for example, a linear, branched, or cyclic methylene group, ethylene group, propylene group, isobutylene group, sec-butylene group, tert-butylene group, pentylene group, hexylene group, and the like. The one or more hydrogen atoms contained in the alkylene group may be respectively substituted with known various substituents. Examples of the substituents may be an alkyl group having 1 to 10 carbon atoms, an alkenyl group having 2 to 10 carbon atoms, an alkynyl group having 2 to 10 carbon atoms, an aryl group having 6 to 12 carbon atoms, a heteroaryl group having 2 to 12 carbon atoms, an arylalkyl group having 6 to 12 carbon atoms, a halogen atom, a cyano group, an amino group, an amidino group, a nitro group, an amide group, a carbonyl group, a hydroxyl group, a sulfonyl group, a carbamate group, an alkoxy group having 1 to 10 carbon atoms, and the like.

The heteroalkylene group may contain O, N, or S as a heteroatom in the alkylene group, and may include an oxyalkylene and the like. The one or more hydrogen atoms contained in the heteroalkylene group can be substituted with a substituent, similarly to the case of the alkyl group.

More specifically, the branched repeating unit may include a repeating unit represented by the following Chemical Formula 1 or a repeating unit represented by the following Chemical Formula 2.

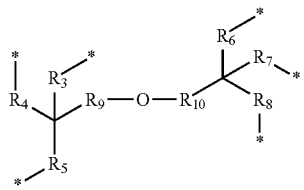

[Chemical Formula 1]

In Chemical Formula 1, $R_3$ to $R_{10}$ may be the same as or different from each other and are each independently an alkylene group having 1 to 10 carbon atoms.

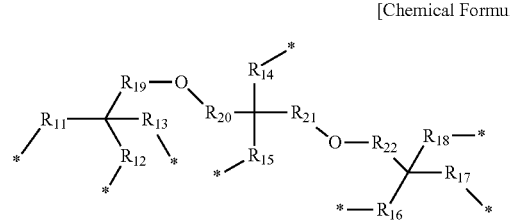

[Chemical Formula 2]

In Chemical Formula 2, $R_{11}$ to $R_{22}$ may be the same as or different from each other and are each independently an alkylene group having 1 to 10 carbon atoms. In Chemical Formulae 1 and 2, "*" means a bonding point.

More specifically, the repeating unit of Chemical Formula 1 is a repeating unit derived from dipentaerythritol which will be described later, and the repeating unit represented by Chemical Formula 2 is a repeating unit derived from tripentaerythritol which will be described later.

On the other hand, the aliphatic polycarbonate repeating unit having a chain structure contained in the polycarbonate-polyester copolymer may be represented by the following Chemical Formula 3.

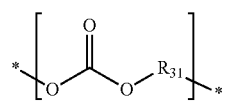

[Chemical Formula 3]

In Chemical Formula 3, $R_{31}$ is an alkylene group having 3 to 30 carbon atoms or a heteroalkylene group having 3 to 30 carbon atoms.

The contents relating to the alkylene group and the heteroalkylene group include those described above in the branched repeating unit.

Examples of the linear or branched alkylene having 3 to 30 carbon atoms are not particularly limited, but for example, a linear or branched alkylene having 3 to 10 carbon atoms, particularly, n-butylene, 2,2-dimethylpropylene, and the like can be used. Preferably, n-butylene can be used.

Examples of the linear or branched heteroalkylene having 3 to 30 carbon atoms are not particularly limited, but for example, a compound represented by the following Chemical Formula 4-1 or 4-2 may be used.

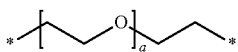

[Chemical Formula 4-1]

In Chemical Formula 4-1, a is an integer of 1 to 10.

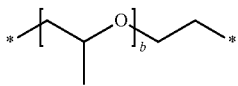

[Chemical Formula 4-2]

In Chemical Formula 4-2, b is an integer of 1 to 7.

The aromatic polyester repeating unit contained in the polycarbonate-polyester copolymer may be represented by the following Chemical Formula 5.

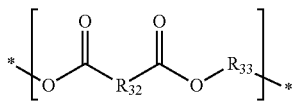

[Chemical Formula 5]

In Chemical Formula 5, $R_{32}$ is an arylene group having 6 to 20 carbon atoms or a heteroarylene group having 5 to 20 carbon atoms, and $R_{33}$ is an alkylene group having 3 to 30 carbon atoms or a heteroalkylene group having 3 to 30 carbon atoms.

The arylene group is a divalent functional group derived from an arene, and examples thereof may be a phenylene group, a biphenylene group, a terphenylene group, a stilbenylene group, a naphthylenyl group, and the like, but are not limited thereto. The one or more hydrogen atoms contained in the arylene group can be substituted with a substituent, similarly to the case of the alkylene group.

The heteroarylene group may contain, for example, O, N, or S as a hetero atom, and the one or more hydrogen atoms contained in the heteroarylene group may be substituted with a substituent, similarly to the case of the alkylene group.

More specifically, examples of the arylene group having 6 to 20 carbon atoms are not particularly limited, but for example, compounds represented by the following Chemical Formulas 6 to 8 can be used, and preferably, a compound represented by Chemical Formula 6 can be used.

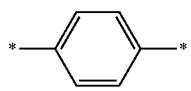

[Chemical Formula 6]

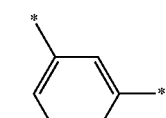

[Chemical Formula 7]

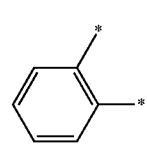

[Chemical Formula 8]

Examples of the linear or branched alkylene having 3 to 30 carbon atoms are not particularly limited, but for example, a linear or branched alkylene having 3 to 10 carbon atoms, specifically, n-butylene, 2,2-dimethylpropylene, and the like can be used, and preferably, n-butylene can be used.

Examples of the linear or branched heteroalkylene having 3 to 30 carbon atoms are not particularly limited, but for example, the compounds represented by Chemical Formulas 11 and 12 can be used.

In the polycarbonate-polyester copolymer, the aliphatic polycarbonate repeating unit having a chain structure and the aromatic polyester repeating unit may be bonded via the branched repeating unit. That is, the polycarbonate-polyester copolymer may include a structure in which the branched repeating unit between the aliphatic polycarbonate repeating unit and the aromatic polyester repeating unit crosslinks the aliphatic polycarbonate repeating unit and the aromatic polyester repeating unit as a crosslinking chain.

The content of the branched repeating unit in the polycarbonate-polyester copolymer may be 0.1 mol % to 10 mol %, 0.1 mol % to 1 mol %, or 0.1 mol % to 0.4 mol %. When the content of the branched repeating unit in the polycarbonate-polyester copolymer is reduced to less than 0.1 mol %, it may be difficult to sufficiently realize the mechanical properties of the branched repeating unit. Further, when the content of the branched repeating unit in the polycarbonate-polyester copolymer is increased to more than 10 mol %, the molding processability of the resin composition containing the polycarbonate-polyester copolymer can be deteriorated.

The weight average molecular weight of the polycarbonate-polyester copolymer may be from 50,000 g/mol to 500,000 g/mol. Examples of the method for measuring the weight average molecular weight of the polycarbonate-polyester copolymer are not particularly limited, but for example, a weight average molecular weight in terms of polystyrene measured by a GPC method can be used. If the weight average molecular weight of the polycarbonate-polyester copolymer is less than 50,000 g/mol, the moldability and processability of the polycarbonate-polyester copolymer can be reduced.

Examples of the method for preparing the polycarbonate-polyester copolymer are not particularly limited, but for example, a method for preparing a polycarbonate-polyester copolymer including the steps of: subjecting a mixture of a pentavalent to decavalent polyol compound, an aliphatic diol having a chain structure, an aliphatic carbonate compound and an aromatic dicarboxylic acid or an ester compound thereof to an esterification reaction; and subjecting the esterification reaction product to a polycondensation reaction, can be used.

Examples of the pentavalent to decavalent polyol compound include dipentaerythritol and tripentaerythritol. The valency of the polyol compound may be determined depending on the number of hydroxy groups contained in the polyol compound. The pentavalent to decavalent polyol compound means that the number of hydroxy groups contained in the polyol compound is 5 to 10.

Examples of the aliphatic diol having the chain structure are not particularly limited, but for example, 1,4-butanediol, 2,2-dimethylpropane-1,3-diol, diethylene glycol, and the like can be used, and preferably, 1,4-butanediol can be used.

Examples of the aliphatic carbonate compound are not particularly limited, but for example, dialkyl carbonate can be used. In the dialkyl carbonate, examples of the alkyl group are not particularly limited, but for example, a linear or branched alkyl group having 1 to 10 carbon atoms may be used, and preferably, a methyl group can be used.

Examples of the aromatic dicarboxylic acid or its ester compound are not particularly limited, but for example, dialkyl phthalate may be used. In the dialkyl phthalate, examples of the alkyl group are not particularly limited, and for example, a linear or branched alkyl group having 1 to 10 carbon atoms can be used, and preferably, a methyl group can be used. In the dialkyl phthalate, examples of the position formed by the two alkyl groups are not particularly limited, and examples thereof include 1,4-dialkyl phthalate, 1,3-dialkyl phthalate, 1,2-dialkyl phthalate and the like, and preferably, 1,4-dialkyl phthalate can be used.

The weight ratio of the polyol compound relative to 100 parts by weight of the aliphatic diol having the chain structure may be 0.001 parts by weight to 1 part by weight, or 0.1 parts by weight to 0.9 parts by weight. Consequently, the polycarbonate-polyester copolymer can ensure processability and heat resistance due to a high molecular weight together with excellent mechanical properties. When the weight ratio of the polyol compound relative to 100 parts by weight of the aliphatic diol having the chain structure is reduced to less than 0.001 parts by weight, it may be difficult to sufficiently realize the effect of improving the mechanical properties due to the polyol compound. Further, when the weight ratio of the polyol compound relative to 100 parts by weight of the aliphatic diol having the chain structure is increased to more than 1 part by weight, the molecular weight of the polycarbonate-polyester copolymer is not sufficiently increased, and thus the mechanical properties may be reduced.

The esterification reaction step may be carried out at a temperature of 100° C. to 200° C. for 10 minutes to 10 hours. The esterification reaction may be carried out in either a batch or continuous mode, and the reactants may be added individually or in a mixture of two or more thereof.

Further, the method for producing the polycarbonate-polyester copolymer may include a step of subjecting the esterification reaction product to a polycondensation reaction. Through the polycondensation reaction, reaction can be carried out while removing volatile substances, thereby maximizing the conversion rate.

Specifically, the polycondensation reaction step may include a step of reducing the pressure from a pressure of 50 mmHg to 150 mmHg to a pressure of 0.1 mmHg to 1 mmHg, and a step of reacting at a temperature of 150° C. to 250° C. for 50 to 200 minutes. As a result, only the by-products formed during the reaction can be sufficiently removed out of the reaction system, thus improving the yield of the polycarbonate-polyester copolymer.

The pressure reducing step of the polycondensation reaction may be carried out at a pressure of 0.1 mmHg to 150 mmHg. Specifically, it can be carried out under a condition that the pressure is reduced from a pressure of 80 mmHg to 120 mmHg to a pressure under a high-vacuum state of 0.1 mmHg to 0.5 mmHg stepwise during 1 hour.

If the temperature of the polycondensation reaction is less than 150° C., the poly condensation reaction time becomes longer, a low molecular weight polycarbonate-polyester copolymer is produced, and yellowing of the polycarbonate-polyester copolymer may occur due to the long reaction time. If the temperature of the polycondensation reaction is higher than 250° C., an undesired by-product may be formed as the result of the reaction.

Further, when the polycondensation reaction time is excessively shortened to less than 50 minutes, a monomolecular or oligomer material having a small molecular weight may be discharged to the outside and the yield of the polycarbonate-polyester copolymer can be reduced. If the polycondensation reaction time is excessively long at more than 200 minutes, the energy consumption is high and the reaction efficiency can be reduced.

The mixture of the pentavalent to decavalent polyol compound, the aliphatic diol having a chain structure, the aliphatic carbonate compound, and the aromatic dicarboxylic acid or the ester compound thereof may further include at least one selected from the group consisting of a thermal stabilizer, a base catalyst, and a metal catalyst.

Examples of the base catalyst are not particularly limited, but for example, sodium hydride (NaH), sodium hydroxide (NaOH), sodium methoxide (NaOMe), sodium ethoxide (NaOEt), potassium carbonate ($K_2CO_3$), potassium hydride (KH), ammonium hydroxide ($NH_4OH$), lithium hydroxide (LiOH), lithium methoxide (LiOMe), lithium ethoxide (LiOEt), or a mixture of two or more thereof may be used.

As the metal catalyst, a titanium-based compound, a germanium-based compound, an antimony-based compound, or a mixture of two or more thereof can be used. Examples of the germanium-based compound include germanium oxide ($GeO_2$), germanium methoxide ($Ge(OMe)_2$), germanium ethoxide ($Ge(OEt)_2$), and the like. Examples of the antimony-based compound include antimony oxide ($Sb_2O_3$), antimony acetate ($Sb(OAc)_3$), and the like.

The amount of the catalyst to be added is not particularly limited, but for example, in the case of the base catalyst, it may be added in an amount of 0.05 mol to 0.1 mol.

Examples of the thermal stabilizer are not particularly limited, but for example, it may be phosphorus-based compounds. Examples of the phosphorus-based compounds include phosphoric acid ($H_3PO_4$), phosphoric acid derivative compounds (phosphoric acid ester, etc.), phosphorous acid ($H_3PO_3$), and phosphorous acid derivative compounds (phosphorous acid ester, etc.).

On the other hand, the biodegradable polymer resin composition includes a biodegradable polyester resin having a melt index (measured at 190° C., 2.16 kg) of 3 g/10 min to 20 g/10 min together with the polycarbonate-polyester copolymer. As a result, the biodegradability and mechanical properties of the biodegradable polymer resin composition can be improved, and the molding processability of the film and the like can be simultaneously improved.

Specifically, in the biodegradable polymer resin composition, the content of the biodegradable polyester resin relative to 100 parts by weight of the polycarbonate-polyester copolymer may be 10 parts by weight to 50 parts by weight, or 20 parts by weight to 30 parts by weight. When the content of the biodegradable polyester resin relative to 100 parts by weight of the polycarbonate-polyester copolymer is excessively reduced to less than 10 parts by weight, it is difficult to sufficiently realize the effect of improving the molding processability due to the biodegradable polyester resin. When the content of the biodegradable polyester resin relative to 100 parts by weight of the polycarbonate-polyester copolymer is excessively increased to more than 50 parts by weight, the mechanical properties of the biodegradable polymer resin composition may be reduced.

Specifically, based on 100 parts by weight of the biodegradable polymer resin composition, the content of the polycarbonate-polyester copolymer may be 50 to 90 parts by weight, and the content of the biodegradable polyester resin may be 10 to 50 parts by weight.

The biodegradable polyester resin may include an aliphatic biodegradable polyester resin or an aliphatic/aromatic biodegradable copolyester resin. The aliphatic biodegradable polyester resin is a polyester produced through the synthesis of an aliphatic diol and an aliphatic dicarboxylic acid. For example, polylactic acid, polybutylene succinate (PBS), polybutylene adipate (PBA), polybutylene sebacate (PBSe), polybutylene succinate adipate (PBSA), polybutylene succinate sebacate (PBSSe), or a corresponding polyester amide or polyester urethane, or a mixture of two or more thereof, may be used, and preferably, polylactic acid may be used.

The aliphatic/aromatic biodegradable copolyester resin is a copolymer resin of an aliphatic biodegradable polyester resin and an aromatic biodegradable polyester resin, and can be produced through (1) synthesis of an aliphatic diol, an aliphatic dicarboxylic acid, and an aromatic dicarboxylic acid, (2) synthesis of an aliphatic diol, an aliphatic dicarboxylic acid, and an aromatic dicarboxylic acid, (3) synthesis of an aliphatic diol, an aromatic diol, and an aliphatic dicarboxylic acid, (4) synthesis of an aliphatic diol, an aromatic diol, and an aromatic dicarboxylic acid, and (5) synthesis of an aliphatic diol, an aromatic diol, an aliphatic dicarboxylic acid, and an aromatic dicarboxylic acid. Examples of the aliphatic/aromatic biodegradable copolyester resin may be poly(butylene adipate-co-terephthalate), poly(butylene succinate-co-terephthalate), poly(butylene sebacate-co-terephthalate), or a mixture of two or more thereof.

The biodegradable polyester resin has a melting point of less than 240° C., or 140° C. to 200° C., and a glass transition temperature of more than 55° C., or 60° C. to 90° C. The melting point or the glass transition temperature can be confirmed through DSC measurement data and the like. For example, a method in which the biodegradable polyester resin is kept at 250° C. for 5 minutes, gradually cooled down to room temperature, and then scanned again at a temperature raising rate of 10° C./min to perform measurement can be used.

The biodegradable polyester resin may have a weight average molecular weight of 50,000 g/mol to 200,000 g/mol. When the weight average molecular weight of the biodegradable polyester resin is less than 50,000 g/mol, the mechanical properties of the biodegradable polymer resin composition may be deteriorated. On the other hand, when the weight average molecular weight of the biodegradable polyester resin is more than 200,000 g/mol, as the melting point of the biodegradable polyester resin increases, not only can the processability be deteriorated, but also the viscosity increases and the pressure of the extruder rises, making it impossible to smooth the film forming process. Examples of the method for measuring the weight average molecular weight of the biodegradable polyester resin are not particularly limited, but for example, a weight average molecular weight in terms of polystyrene measured by a GPC method can be used.

The biodegradable polyester resin may have a residual monomer content of less than 0.3% by weight, or 0.001% by weight to 0.25% by weight. The residual monomer content can be calculated based on the weight of the entire biodegradable polyester resin, and for example, when polylactic acid is used as the biodegradable polyester resin, the residual monomer content may refer to the content of lactic acid remaining in the polylactic acid. When the residual monomer content of the biodegradable polyester resin is increased to 0.3% by weight or more, a side reaction may proceed during the extrusion of the resin composition mixed with the biodegradable polyester resin, and the mechanical properties of the biodegradable polyester resin may be deteriorated.

In addition, the biodegradable polyester resin may have a water content of less than 1000 ppm, or 100 ppm to 400 ppm. The water content may be calculated based on the weight of the entire biodegradable polyester resin. For example, when polylactic acid is used as the biodegradable polyester resin, the residual monomer content may mean the amount of water remaining in the polylactic acid. When the water content of the biodegradable polyester resin is increased to 1000 ppm or more, the physical properties may be rapidly lowered by hydrolysis.

On the other hand, the biodegradable polymer resin composition may further include one or more additives selected from the group consisting of a starch, a wax, a dispersant, a thermal stabilizer, an antioxidant, an anti-blocking agent, a slip agent, an ultraviolet stabilizer, and an inorganic filler.

The starch may be a thermoplastic starch (TPS) or a modified starch. Specifically, it is a starch imparted with thermoplastic properties, which can freely change the shape without being carbonized at a certain temperature or higher, similar to polyethylene, polystyrene, and polypropylene, which are conventional general-purpose resins, by adding a plasticizer to a starch which is a natural polymer. The content of the starch may be 0.1 to 40 parts by weight based on 100 parts by weight of the biodegradable polymer resin composition. The biodegradability of the biodegradable polymer resin composition can be controlled by the starch.

The dispersant may include one or more selected from the group consisting of polyvinyl alcohol, polyvinyl acetate, methyl cellulose, hydroxyethyl cellulose, polyvinyl pyrrolidone, tricalcium phosphate, calcium carbonate, talc, bentonite, magnesium silicate, and the like, and preferably, calcium carbonate can be used. The calcium carbonate may be contained in an amount of 0.1 to 10 parts by weight based on 100 parts by weight of the polycarbonate-polyester copolymer.

That is, the biodegradable polymer resin composition may further include starch and calcium carbonate together with the polycarbonate-polyester copolymer and the biodegradable polyester resin. When the starch and calcium carbonate are added together, 0.1 to 10 parts by weight of the calcium carbonate may be added relative to 100 parts by weight of the starch.

On the other hand, according to another embodiment of the invention, a biodegradable polymer resin molded article can be provided, including the above-mentioned biodegradable polymer resin composition.

As described above, the biodegradable polymer resin composition of one embodiment exhibits excellent mechanical properties while improving the molding processability, so that the molding process can be easily performed. Consequently, the biodegradable polymer resin composition can be applied to various thermoforming products such as films and containers. For example, the biodegradable polymer resin molded article may be used as a garbage bag, a shopping bag, an industrial packaging film, an agricultural film, a disposable table cloth, or a rollback.

The molded article may be manufactured by molding the biodegradable polymer resin composition through various molding methods depending on its application purpose, for example, molding processes such as injection, extrusion, extrusion blowing, injection blowing, and profile extrusion, and post-processing such as thermoforming using the same.

The specific shape and size of the molded article can be determined according to the application purpose thereof. For example, it can be in the form of a sheet or a container. In the case of a sheet, it may have a thickness of 10 μm to 1000 μm.

The contents relating to the biodegradable polymer resin composition include those described above in relation to the above embodiment.

Advantageous Effects

According to the present invention, a biodegradable polymer resin composition which can realize excellent mechanical properties together with biodegradability and has improved molding processability, and a molded article thereof, can be provided.

DETAILED DESCRIPTION OF THE EMBODIMENTS

The present invention is described in more detail by way of the examples provided below. However, the following examples are given for illustrative purposes only, and the scope of the present invention is not intended to be limited to or by these examples.

Preparation Examples 1 to 5: Preparation of Polycarbonate-Polyester Copolymer

Preparation Example 1

In order to prepare an aliphatic polycarbonate, 2.5 kg of 1,4-butanediol, 2.5 kg of dimethyl carbonate, 2.5 kg of dimethyl terephthalate, 8.8 g of dipentaerythritol, and 2.2 g of sodium hydroxide were mixed together, and the reaction mixture was allowed to react for 4 hours while gradually raising the temperature to 200° C. Thereafter, the temperature was increased to 200° C., and the condensation polymerization was carried out for 100 minutes while gradually reducing the pressure to remove volatile substances. Thereby, a polycarbonate-polyester copolymer was produced.

Preparation Example 2

A polycarbonate-polyester copolymer was produced in the same manner as in Preparation Example 1, except that 6.5 g of tripentaerythritol was added instead of 8.8 g of dipentaerythritol.

Preparation Example 3

A polycarbonate-polyester copolymer was produced in the same manner as in Preparation Example 1, except that 18.4 g of glycerol propoxylate was added instead of 8.8 g of dipentaerythritol.

Preparation Example 4

2.5 kg of 1,4-butanediol, 2.7 kg of dimethyl carbonate, 1.7 kg of dimethyl terephthalate, 8.8 g of dipentaerythritol, and 2.2 g of sodium hydroxide were mixed together, and the reaction mixture was allowed to react for 4 hours while gradually raising the temperature to 200° C. Thereafter, the temperature was increased to 200° C., and the condensation polymerization was carried out for 100 minutes while gradually reducing the pressure to remove volatile substances. Thereby, a polycarbonate-polyester copolymer was produced.

Preparation Example 5

A polycarbonate-polyester copolymer was produced in the same manner as in Preparation Example 1, except that 8.8 g of dipentaerythritol was not added.

Examples 1 to 3: Preparation of Biodegradable Polymer Resin Composition and Molded Article Thereof Example 1

77 wt % of the polycarbonate-polyester copolymer of Preparation Example 1, 20 wt % of polylactic acid (PLA, Natureworks 2003D), and 3 wt % of calcium carbonate were mixed. Based on 100 parts by weight of the mixture, 0.15 parts by weight of Anox 20, 0.15 parts by weight of Alkanox 240 as a secondary antioxidant, 0.15 parts by weight of HI-LUBE as a wax, and 0.15 parts by weight of Erucamide as a slip agent were mixed and then extruded to prepare a biodegradable polymer resin composition.

The biodegradable polymer resin composition was extruded under the conditions of a temperature of 180° C., a vacuum pressure of 8 Torr, screen mesh of 120/200/120, a screw rpm of 300, and a motor load of 70%, using a co-rotating type of twin screw extruder (TEK30MHS, SM PLATEK Co., Ltd.) capable of combining screw elements. Thereafter, a film having a thickness of 30 in was produced under the conditions of a temperature of 160° C. and a blow-up ratio of 2.5 using a blow film molding machine having a diameter of 58 mm.

Example 2

A biodegradable polymer resin composition and a molded article thereof were produced in the same manner as in Example 1, except that the polycarbonate-polyester copolymer of Preparation Example 2 was used instead of the polycarbonate-polyester copolymer of Preparation Example 1.

Example 3

A biodegradable polymer resin composition and a molded article thereof were produced in the same manner as in Example 1, except that the polycarbonate-polyester copolymer of Preparation Example 4 was used instead of the polycarbonate-polyester copolymer of Preparation Example 1.

Comparative Examples 1 to 3: Preparation of Biodegradable Polymer Resin Composition and Molded Article Thereof Comparative Example 1

A biodegradable polymer resin molded article was produced in the same manner as in Example 1, by using a biodegradable polymer resin composition containing the polycarbonate-polyester copolymer of Preparation Example 1.

Comparative Example 2

A biodegradable polymer resin composition and a molded article thereof were produced in the same manner as in Example 1, except that the polycarbonate-polyester copolymer of Preparation Example 5 was used instead of the polycarbonate-polyester copolymer of Preparation Example 1.

Comparative Example 3

A biodegradable polymer resin composition and a molded article thereof were produced in the same manner as in Example 1, except that the polycarbonate-polyester copolymer of Preparation Example 3 was used instead of the polycarbonate-polyester copolymer of Preparation Example 1.

Experimental Example: Measurement of Physical Properties of Biodegradable Polymer Resin Molded Article Obtained in Examples and Comparative Examples The physical properties of the biodegradable polymer resin molded articles obtained in the examples and comparative examples were measured by the following methods, and the results are shown in Table 1 below.

Experimental Example 1: Measurement of Tensile Strength (ASTM D 638)

For the films prepared in the examples and comparative examples, the tensile strength was measured at a standard line interval of 25 mm and a tensile speed of 500 mm/min under conditions of a temperature of 23° C. and relative humidity of 50% using a tensile testing machine (UTM 4520, Instron Co.) in accordance with ASTM D 638. At this time, the machine direction of the film was represented by MD and the transverse direction by TD.

Experimental Example 2: Measurement of Elongation (ASTM D 638)

For the films prepared in the examples and comparative examples, the elongation at break of the films was measured under the same conditions as in the tensile strength.

Experimental Example 3: Measurement of Elmendorf Tear Strength (ASTM D 1922)

For the films prepared in the examples and comparative examples, the tear strength was measured according to ASTM D 1922 using the Elmendorf Tear Test. At this time, the machine direction of the film was represented by MD and the transverse direction by TD. At this time, when the absolute value of the difference between the MD direction Elmendorf tear strength and the TD direction Elmendorf tear strength is smaller, the tear strength of the film is balanced and excellent durability characteristics can be realized.

TABLE 1

Experimental Example Results of Examples and Comparative Examples

| Category | Example 1 | Example 2 | Example 3 | Comparative Example 1 | Comparative Example 2 | Comparative Example 3 |
|---|---|---|---|---|---|---|
| Tensile strength(MD, kgf/cm$^2$) | 412 | 385 | 330 | 309 | 310 | 350 |
| Tensile strength (TD, kgf/cm$^2$) | 320 | 323 | 240 | 300 | 350 | 300 |
| Tear strength (MD, gf) | 20 | 18 | 16 | 30 | 35 | 17 |
| Tear strength (TD, gf) | 355 | 300 | 520 | (unmeasurable) | (unmeasurable) | 350 |
| Absolute value of difference between TD Elmendorf tear strength and MD Elmendorf tear strength | 335 | 282 | 504 | (very large) | (very large) | 333 |
| Elongation (MD, %) | 290 | 250 | 230 | 264 | 250 | 200 |
| Elongation (TD, %) | 350 | 359 | 360 | 350 | 353 | 300 |

From the results shown in Table 1, when comparing with the examples in which the polylactic acid was compounded with the polycarbonate-polyester copolymer in the biodegradable polymer resin composition, it could be confirmed that in Comparative Example 1 in which polylactic acid was not compounded, the absolute value of the difference between the TD direction tear strength and the MD direction tear strength was greatly increased so as to be unmeasurable, so that the tear strength of the film was not balanced and thus the durability was reduced.

In addition, at the time of producing the film of Comparative Example 1, it was confirmed that problems such as sticking of the inner surfaces of the films to each other or sticking to the roll occurred, so that molding processability was remarkably decreased as compared with the examples.

On the other hand, even if the polylactic acid and the polycarbonate-polyester copolymer were compounded, when the branched repeating unit derived from the polyol compound having three or more functional groups was not contained in the polycarbonate-polyester copolymer as in Comparative Example 2, the absolute value of the difference between the TD direction tear strength and the MD direction tear strength was greatly increased so as to be unmeasurable, so the tear strength of the film was not balanced and thus the durability was reduced.

In addition, when the branched repeating unit derived from the polyol compound having three functional groups was contained in the polycarbonate-polyester copolymer as in Comparative Example 3, it was confirmed that the elongation was greatly reduced as compared with the examples.

The invention claimed is:

1. A biodegradable polymer resin composition comprising:
   a polycarbonate-polyester copolymer including a branched repeating unit containing a mediating functional group including a central element and five to ten alkylene or heteroalkylene functional groups bonded to the mediating functional group, an aliphatic polycarbonate repeating unit having a chain structure, and an aromatic polyester repeating unit; and
   a biodegradable polyester resin having a melt index (measured at 190° C., 2.16 kg) of 3 g/10 min to 20 g/10 min.

2. The biodegradable polymer resin composition of claim 1, wherein, based on 100 parts by weight of the biodegradable polymer resin composition, the content of the polycarbonate-polyester copolymer is 50 to 90 parts by weight, and the content of the biodegradable polyester resin is 10 to 50 parts by weight.

3. The biodegradable polymer resin composition of claim 1, wherein the central element contained in the branched repeating unit includes one or more selected from the group consisting of carbon, nitrogen, phosphorus, sulfur, oxygen, and silicon.

4. The biodegradable polymer resin composition of claim 1, wherein the branched repeating unit includes a repeating unit represented by the following Chemical Formula 1 or a repeating unit represented by the following Chemical Formula 2:

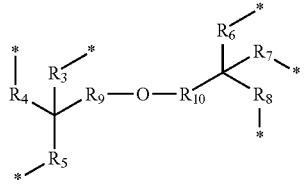

[Chemical Formula 1]

wherein, in Chemical Formula 1,
R$_3$ to R$_{10}$ are the same as or different from each other and are each independently an alkylene group having 1 to 10 carbon atoms, and * means a bonding point,

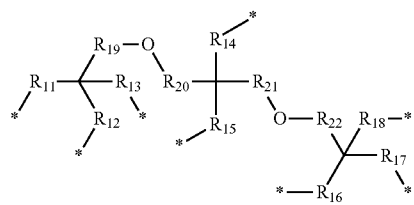

[Chemical Formula 2]

wherein, in Chemical Formula 2,
R$_{11}$ to R$_{22}$ are the same as or different from each other and are each independently an alkylene group having 1 to 10 carbon atoms, and * means a bonding point.

5. The biodegradable polymer resin composition of claim 1, wherein the aliphatic polycarbonate repeating unit having a chain structure and the aromatic polyester repeating unit is bonded via the branched repeating unit.

6. The biodegradable polymer resin composition of claim 1, wherein the content of the branched repeating unit contained in the polycarbonate-polyester copolymer is 0.1 mol % to 10 mol %.

7. The biodegradable polymer resin composition of claim 1, wherein the biodegradable polyester resin includes an aliphatic biodegradable polyester resin or an aliphatic/aromatic biodegradable copolyester resin.

8. The biodegradable polymer resin composition of claim 1, wherein the biodegradable polyester resin is polylactic acid.

9. The biodegradable polymer resin composition of claim 1, wherein the biodegradable polyester resin has a melting point of less than 240° C. and a glass transition temperature of more than 55° C.

10. The biodegradable polymer resin composition of claim 1, wherein the biodegradable polyester resin has a weight average molecular weight of 50,000 g/mol to 200,000 g/mol.

11. The biodegradable polymer resin composition of claim 1, wherein the biodegradable polyester resin has a residual monomer content of less than 0.3% by weight.

12. The biodegradable polymer resin composition of claim 1, wherein the biodegradable polyester resin has a water content of less than 1000 ppm.

13. The biodegradable polymer resin composition of claim 1, wherein the polycarbonate-polyester copolymer has a weight average molecular weight of 50,000 g/mol to 500,000 g/mol.

14. The biodegradable polymer resin composition of claim 1, wherein the aliphatic polycarbonate repeating unit having a chain structure is represented by the following Chemical Formula 3:

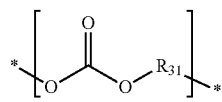

[Chemical Formula 3]

wherein, in Chemical Formula 3, $R_{31}$ is an alkylene group having 3 to 30 carbon atoms or a heteroalkylene group having 3 to 30 carbon atoms, and * means a bonding point.

15. The biodegradable polymer resin composition of claim 1, wherein the aromatic polyester repeating unit is represented by the following Chemical Formula 5:

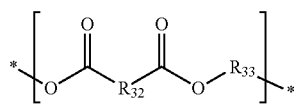

[Chemical Formula 5]

wherein, in Chemical Formula 5, $R_{32}$ is an arylene group having 6 to 20 carbon atoms or a heteroarylene group having 5 to 20 carbon atoms, $R_{33}$ is an alkylene group having 3 to 30 carbon atoms or a heteroalkylene group having 3 to 30 carbon atoms, and

* means a bonding point.

16. The biodegradable polymer resin composition of claim 1, wherein the biodegradable polymer resin composition further includes a starch or a dispersant.

17. A biodegradable polymer resin molded article comprising the biodegradable polymer resin composition of claim 1.

* * * * *